United States Patent
Oh et al.

(10) Patent No.: US 12,424,660 B2
(45) Date of Patent: Sep. 23, 2025

(54) ELECTROLYTE FOR LITHIUM SECONDARY BATTERY AND LITHIUM SECONDARY BATTERY INCLUDING THE SAME

(71) Applicant: SK ON CO., LTD., Seoul (KR)

(72) Inventors: Sung Yon Oh, Daejeon (KR); In Haeng Cho, Daejeon (KR); Myoung Lae Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 552 days.

(21) Appl. No.: 17/954,407

(22) Filed: Sep. 28, 2022

(65) Prior Publication Data

US 2023/0098975 A1   Mar. 30, 2023

(30) Foreign Application Priority Data

Sep. 28, 2021 (KR) ........................ 10-2021-0128235

(51) Int. Cl.
*H01M 10/0567* (2010.01)
*H01M 10/052* (2010.01)
*H01M 10/0568* (2010.01)
*H01M 10/0569* (2010.01)

(52) U.S. Cl.
CPC ..... *H01M 10/0567* (2013.01); *H01M 10/052* (2013.01); *H01M 10/0568* (2013.01); *H01M 10/0569* (2013.01); *H01M 2300/0028* (2013.01); *H01M 2300/0051* (2013.01)

(58) Field of Classification Search
None
See application file for complete search history.

(56) References Cited

U.S. PATENT DOCUMENTS

| | | | |
|---|---|---|---|
| 9,218,915 B2 * | 12/2015 | Zhang | H01G 11/64 |
| 2010/0183926 A1 * | 7/2010 | Kim | H01M 10/0525 |
| | | | 429/200 |
| 2011/0136019 A1 | 6/2011 | Amiruddin et al. | |
| 2013/0280622 A1 | 10/2013 | Tokuda et al. | |
| 2019/0288336 A1 | 9/2019 | Park et al. | |
| 2021/0344046 A1 * | 11/2021 | Matsuoka | H01M 50/409 |
| 2024/0105996 A1 * | 3/2024 | Mizuno | C07F 7/06 |

FOREIGN PATENT DOCUMENTS

| | | |
|---|---|---|
| JP | 200157236 A | 2/2001 |
| JP | 2001057236 A * | 2/2001 |
| KR | 1020060088950 A | 8/2006 |
| KR | 1020100086370 A | 7/2010 |
| KR | 1020120101499 A | 9/2012 |
| KR | 1020180036457 A | 4/2018 |
| KR | 1020190108424 A | 9/2019 |

OTHER PUBLICATIONS

Machine Translation of JP 2001-057236 A (Year: 2001).*

* cited by examiner

*Primary Examiner* — Kevin M Bernatz
(74) *Attorney, Agent, or Firm* — The Webb Law Firm

(57) ABSTRACT

An electrolyte for a lithium secondary battery according to embodiments of the present invention includes an organic solvent, a lithium salt, and an additive including a succinic anhydride-based compound substituted with a trialkoxysilyl alkyl group. A lithium secondary battery including the electrolyte provides enhanced cycle property and high temperature stability.

11 Claims, 4 Drawing Sheets

ELECTROLYTE FOR LITHIUM SECONDARY BATTERY AND LITHIUM SECONDARY BATTERY INCLUDING THE SAME

CROSS-REFERENCE TO RELATED APPLICATION

This application claims priority to Korean Patent Applications No. 10-2021-0128235 filed Sep. 28, 2021, the disclosure of which is hereby incorporated by reference in its entirety.

BACKGROUND OF THE INVENTION

1. Field of the Invention

The present invention relates to an electrolyte for a lithium secondary battery and a lithium secondary battery including the same. More particularly, the present invention relates to an electrolyte for a lithium secondary battery including an organic solvent and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

The electrolyte includes a lithium salt such as $LiPF_6$, etc. The lithium salt may react with a moisture to form hydrogen fluoride (HF). Hydrogen fluoride may deteriorate cycle and high temperature storage properties of the battery.

SUMMARY OF THE INVENTION

According to an aspect of the present invention, there is provided an electrolyte capable of providing a lithium secondary battery with improved chemical stability and operational reliability.

According to an aspect of the present invention, there is provided a lithium secondary battery improved chemical stability and operational reliability.

An electrolyte for a lithium secondary battery according to embodiments of the present invention includes an organic solvent, a lithium salt and an additive including a succinic anhydride-based compound substituted with a trialkoxysilyl alkyl group.

In some embodiments, an alkoxy group included in the trialkoxysilyl alkyl group may have 1 to 6 carbon atoms.

In some embodiments, an alkylene group of the trialkoxysilyl alkyl group may have1 to 6 carbon atoms.

In some embodiments, the succinic anhydride-based compound may be represented by Chemical Formula 1.

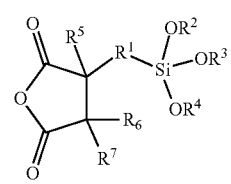

[Chemical Formula 1]

In Chemical Formula 1, $R^1$ is an alkylene group having 1 to 6 carbon atoms, $R^2$ to $R^4$ are each independently an alkyl group having 1 to 6 carbon atoms, and $R^5$ to $R^7$ are each independently hydrogen or an alkyl group having 1 to 6 carbon atoms.

In some embodiments, the succinic anhydride-based compound includes a compound represented by Chemical Formula 2.

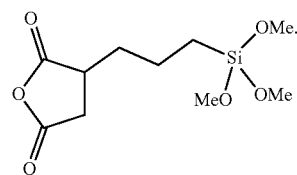

[Chemical Formula 2]

In some embodiments, the succinic anhydride-based compound may be included in an amount from 0.1 wt % to 5 wt % based on a total weight of the electrolyte.

In some embodiments, the additive may further include a lithium phosphate-based compound.

In some embodiments, the lithium phosphate-based compound may include a compound represented by Chemical Formula 3.

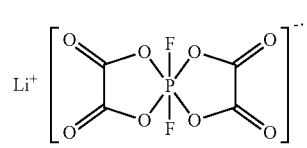

[Chemical Formula 3]

In some embodiments, a weight ratio of the succinic anhydride-based compound and the lithium phosphate-based compound is in a range from 1:0.2 to 1:10.

In some embodiments, the organic solvent may include at least one of ethylene carbonate (EC), ethyl methyl carbonate (EMC), dimethyl carbonate (DMC) and diethyl carbonate (DEC).

A lithium secondary battery includes a case, an electrode assembly including an anode and a cathode accommodated in the case, and the electrolyte for a lithium secondary battery according to embodiments of the present invention.

According to exemplary embodiments of the present invention, a succinic anhydride-based compound substituted with a trialkoxysilyl alkyl group may be used as an additive for an electrolyte for a lithium secondary battery. The succinic anhydride-based compound may remove, e.g., hydrogen fluoride, Additionally, a solid-electrolyte interphase (SEI) having enhanced stability may be formed on an electrode surface, so that side reactions between an active material and the electrolyte may be suppressed. Accordingly, life-span, capacity retention and high-temperature stability of the secondary battery may be improved.

DESCRIPTION OF THE INVENTION

Figure 1:
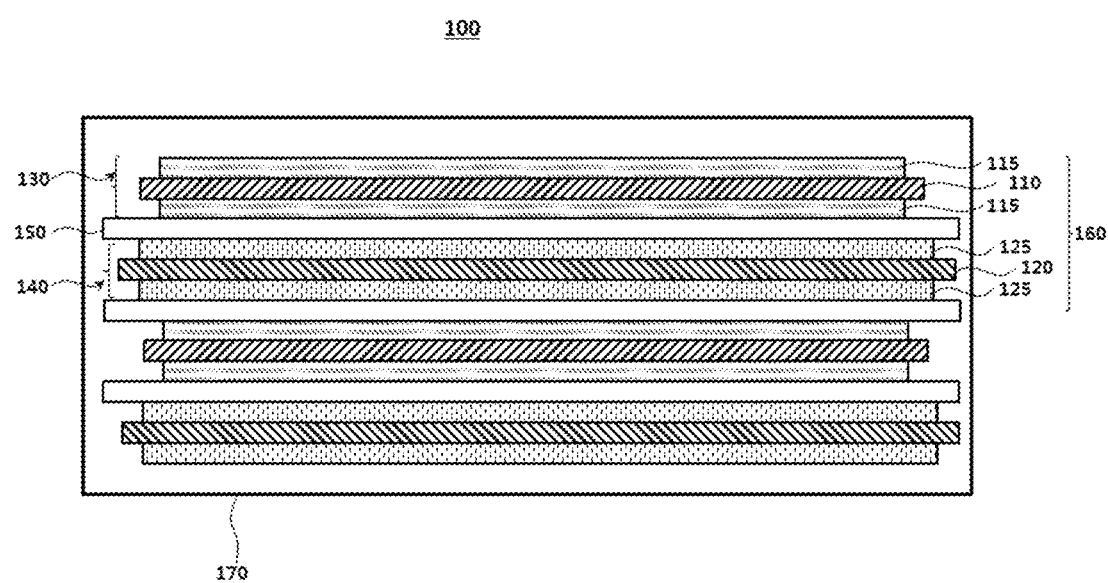
FIG. 1 is a schematic cross-sectional view illustrating a lithium secondary battery in accordance with exemplary embodiments.

According to exemplary embodiments of the present invention, an electrolyte solution a lithium secondary battery including an additive of a predetermined chemical structure is provided. According to exemplary embodiments of the present invention, a lithium secondary battery including the electrolyte solution is also provided.

Hereinafter, the present invention will be described in detail with reference to examples and the accompanying drawings. However, those skilled in the art will appreciate that such embodiments described with reference to the examples and the drawings are provided to further understand the spirit of the present invention and do not limit subject matters to be protected as disclosed in the detailed description and appended claims.

<Electrolyte for Lithium Secondary Battery>

An electrolyte for a lithium secondary battery (hereinafter, that may be abbreviated as an electrolyte) according to embodiments of the present invention may include an organic solvent, and a lithium salt and an additive mixed or dissolved in the organic solvent.

The organic solvent may include an organic compound providing sufficient solubility for the lithium salt and the additive and having no reactivity in the lithium secondary battery. In exemplary embodiments, the organic solvent may include a carbonate-based solvent, an carboxylate-based solvent, an ether-based solvent, a ketone-based solvent, an alcohol-based solvent, an aprotic solvent, or the like. These may be used alone or in combination of 2 or more therefrom.

Examples of the carbonate-based solvent may include dimethyl carbonate (DMC), ethyl methyl carbonate (EMC), methyl propyl carbonate, ethyl propyl carbonate, diethyl carbonate (DEC), dipropyl carbonate, propylene carbonate (PC), ethylene carbonate (EC), fluoroethylene carbonate (FEC), butylene carbonate, etc.

Examples of the carboxylate-based solvent may include methyl acetate (MA), ethyl acetate (EA), n-propyl acetate (n-PA), 1,1-dimethylethyl acetate (1,1-dimethylethyl acetate, DMEA), methyl propionate (MP), ethyl propionate (EP), gamma-butyrolactone (GBL), decanolide, valerolactone, mevalonolactone, caprolactone, etc.

Examples of the ether-based organic solvent may include dibutyl ether, tetraethylene glycol dimethyl ether (TEGDME), diethylene glycol dimethyl ether (DEGDME), dimethoxy ethane, 2-methyltetrahydrofuran, tetrahydrofuran, etc.

Examples of the ketone-based solvent may include cyclohexanone. Examples of the alcohol-based solvent may include ethyl alcohol, isopropyl alcohol, etc.

The aprotic solvent may include a nitrile-based solvent, an amide-based solvent such as a dimethyl formamide (DMF), a dioxolane-based solvent such as 1,3-dioxolane, a sulfolane-based solvent, etc.

In a preferable embodiment, the carbonate-based solvent may be used as the organic solvent. For example, the organic solvent may include ethylene carbonate (EC), ethyl methyl carbonate (EMC), dimethyl carbonate (DMC), diethyl carbonate (DEC), or a combination thereof. Preferably, a mixture of EC and EMC may be provided as the organic solvent.

The lithium salt may include a compound represented by, e.g., $Li^+X^-$.

The anion ($X^-$) of the lithium salt may include, e.g., $F^-$, $Cl^-$, $Br^-$, $I^-$, $NO_3^-$, $N(CN)_2^-$, $BF_4^-$, $ClO_4^-$, $PF_6^-$, $SbF_6^-$, $AsF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2$, $SCN^-$, $(CF_3CF_2SO_2)_2N^-$, $PO_2F_2^-$, etc. These may be used alone or in a combination thereof. Preferably, the lithium salt may include lithium hexafluorophosphate ($LiPF_6$).

In an embodiment, the lithium salt may be included in the organic solvent by a concentration from about 0.1 M to 5 M, preferably about 0.5 M to 2 M. Within the above range, mobility of lithium ions and/or electrons may be facilitated.

The additive agent may include a succinic anhydride-based compound substituted with a trialkoxysilylalkyl group. The succinic anhydride-based compound may include succinic anhydride and a derivative of succinic anhydride. The succinic anhydride derivative may include a compound in which an alkyl group having 1 to 6 carbon atoms is substituted in succinic anhydride.

The succinic anhydride-based compound may be substituted with at least one trialkoxysilyl alkyl group. For example, a carbon atom with carbon number 2 or 3 of the succinic anhydride-based compound may be substituted with the trialkoxysilyl alkyl group The trialkoxysilyl alkyl group may include an alkyl group substituted with a trialkoxysilyl group (a silyl group having three alkoxy groups). The trialkoxysilyl alkyl group may be represented by [—$R_1Si(OR_2)(OR_3)(OR_4)$].

The succinic anhydride-based compound may promote a formation of an SEI with a stable structure to prevent side reactions between an electrode and the electrolyte. In this case, reduction of lithium ions and decomposition of the electrolyte and an active material may be suppressed. Accordingly, cycle properties and high temperature stability of the secondary battery may be improved.

Further, the succinic anhydride-based compound may remove hydrogen fluoride generated in the battery. Accordingly, degradation of battery life-span and performance due to hydrogen fluoride may be suppressed.

In exemplary embodiments, the alkoxy group included in the trialkoxysilyl alkyl group may have 1 to 6 carbon atoms. For example, the alkoxy group may include at least one of a methoxy ($CH_3O$—) group having one to a hexoxy ($C_6H_{13}O$—) group having six carbon atoms. The alkoxy group may be linear or branched. Preferably, the alkoxy group may be the methoxy group.

The trialkoxysilyl alkyl group may include an alkylene group (—$C_nH_{2n}$—) connected to the trialkoxysilyl group. The alkylene group may connect the trialkoxysilyl group to the succinic anhydride-based compound.

In exemplary embodiments, the alkylene group included in the trialkoxysilyl alkyl group may have 1 to 6 carbon atoms. For example, the alkylene group may include at least one of a methylene group ($-CH_2-$) to a hexylene group ($-C_6H_{12}-$). Preferably, the alkylene group may be a propylene group ($-C_3H_6-$).

In exemplary embodiments, the succinic anhydride-based compound may be represented by Chemical Formula 1 below.

[Chemical Formula 1]

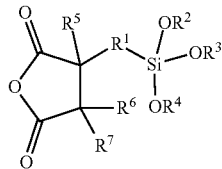

In Chemical Formula 1, $R^1$ may be an alkylene group having 1 to 6 carbon atoms, $R^2$ to $R^4$ may be each independently an alkyl group having 1 to 6 carbon atoms, and $R^5$ to $R^7$ may each independently be hydrogen or an alkyl group having 1 to 6 carbon atoms.

For example, the succinic anhydride-based compound may include a compound represented by Chemical Formula 2 below.

[Chemical Formula 2]

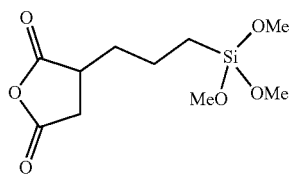

For example, a metal (e.g., a transition metal) may be eluted from a cathode while being using in a lithium secondary battery. The eluted metal may be electrodeposited on an anode to deteriorate performance of the anode. Further, when the lithium secondary battery is driven at a high voltage, a film on a surface of the cathode may be decomposed to cause a side reaction between the surface of the cathode and the electrolyte.

In exemplary embodiments, the additive may stabilize a cathode structure. In this case, the metal elution, gas generation and volume (thickness) expansion may be suppressed while the lithium secondary battery is used and stored at high temperature. Accordingly, the life-span and high-temperature storage properties of the lithium secondary battery may be improved. Additionally, an increase of resistance in the battery may be suppressed during the high voltage driving.

The succinic anhydride-based compound may be included in an amount from 0.1 weight percent (wt %) to 5 wt % based on a total weight of the electrolyte. If the succinic anhydride-based compound is included in an amount of less than 0.1 wt %, the SEI film may not be formed or the removal effect of hydrogen fluoride removal effect may be lowered. If the succinic anhydride-based compound is included in an amount greater than 5 wt %, an internal resistance of the lithium secondary battery may be excessively increased.

Preferably, the succinic anhydride-based compound may be included in an amount from 0.1 wt % to 3 wt %, more preferably 0.3 wt % to 2 wt %.

In some embodiments, the additive may further include, e.g., a lithium phosphate-based compound represented by Chemical Formula 3 below.

[Chemical Formula 3]

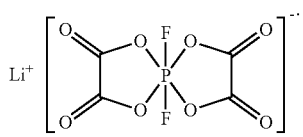

In some embodiments, a weight ratio of the succinic anhydride-based compound and the lithium phosphate-based compound may be from 1:0.2 to 1:10. Preferably, the weight ratio may be from 1:2 to 1:10. Within the above range, the formation of the SEI film may be more effectively promoted to suppress the side reactions with the active material and the electrolyte.

In exemplary embodiments, the electrolyte may include an additional additive such as a cyclic carbonate-based compound including a double bond, a fluorine-substituted cyclic carbonate-based compound, a sultone-based compound, a cyclic sulfonate-based compound, etc.

The cyclic carbonate-based compound including the double bond may include vinylene carbonate, vinyl ethylene carbonate, etc.

The fluorine-substituted cyclic carbonate-based compound may include fluoroethylene carbonate.

The cyclic carbonate-based compound including the double bond and the fluorine-substituted cyclic carbonate-based compound may improve thermal and electrical durability of a film formed on an electrode surface.

For example, each of the cyclic carbonate-based compound including the double bond and the fluorine-substituted cyclic carbonate-based compound may be included in an amount from 0.1 wt % to 5 wt % based on the total weight of the electrolyte. If the content is less than 0.1 wt %, durability of the film may be lowered. If the content is greater than 5 wt %, a thickness of the film may be excessively increased. In this case, the resistance of the battery may be increased and a power of the battery may be decreased.

The sultone-based compound may include 1,3-propane sultone, 1,3-propene sultone, 1,4-butane sultone, etc.

The cyclic sulfonate-based compound may include 1,2-ethylene sulfate, 1,2-propylene sulfate, etc.

The sultone-based compound and the cyclic sulfonate-based compound may form a more stable ion conductive film on the electrode surface.

For example, each of the sultone-based compound and the cyclic sulfonate-based compound may be included in an amount from 0.1 wt % to 5 wt % based on the total weight of the electrolyte. If the content is less than 0.1 wt %, durability of the film may be lowered. If the content is greater than 5 wt %, the thickness of the film may be excessively increased. In this case, the resistance of the battery may be increased and a power of the battery may be decreased.

In some embodiments, the electrolyte may be a non-aqueous electrolyte that does not include water.

<Lithium Secondary Battery>

FIG. 1 is a schematic cross-sectional view illustrating a lithium secondary batteries in accordance with exemplary embodiments.

Referring to FIG. 1, a lithium secondary battery 100 may include an electrode assembly including a cathode 130, an anode 140 and a separation layer 150 interposed between the cathode and the anode. The electrode assembly may be accommodated together with the electrolyte according to the above-described embodiments to be impregnated therein.

The cathode 130 may include a cathode current collector 110 and a cathode active material layer 115 formed by coating a cathode active material on the cathode current collector 110. The cathode active material may include a compound capable of reversibly intercalating and de-intercalating lithium ions.

In exemplary embodiments, the cathode active material may include a lithium-transition metal oxide. For example, the lithium-transition metal oxide may include nickel (Ni), and may further include at least one of cobalt (Co) and manganese (Mn).

For example, the lithium-transition metal oxide may be represented by Chemical Formula 4.

[Chemical Formula 4]

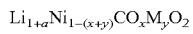

$Li_{1+a}Ni_{1-(x+y)}CO_xM_yO_2$

In Chemical Formula 4, $-0.05 \leq a \leq 0.15$, $0.01 \leq x \leq 0.3$, $0.01 \leq y \leq 0.3$, and M may be at least one element selected from Mn, Mg, Sr, Ba, B, Al, Si, Ti, Zr or W.

A slurry may be prepared by mixing and stirring the cathode active material as described above in a solvent with a binder, a conductive material and/or a dispersive agent. The slurry may be coated on a cathode current collector 110, and then dried and pressed to form the cathode 130.

The cathode current collector 110 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

In exemplary embodiments, the anode 140 may include an anode current collector 120 and an anode active material layer 125 formed by coating an anode active material on the anode current collector 120.

In exemplary embodiments, a silicon (Si)-based compound may be used as the anode active material. In some embodiments, silicon carbide (SiC) or a silicon-carbon particle including a carbon core and a silicon coating layer may be used as the anode active material.

The silicon-carbon particle may be formed by, e.g., depositing a silicon layer on a surface of a graphite core. In an embodiment, the silicon-carbon particle may be formed by coating a silicon layer on commercially available graphite particles through a chemical vapor deposition (CVD) process using a silicon precursor compound such as a silane-based compound.

In some embodiments, the silicon-carbon particles may have a structure in which a plurality of carbon coating layers and silicon coating layers are alternately and repeatedly coated or laminated on the graphite core.

Conventionally, a carbon-based material such as graphite has been used as the anode active material, but a theoretical capacity of the carbon-based material may be limited to about 370 mAh/g. However, according to exemplary embodiments, the silicon-based compound may be used as the anode active material, so that power and capacity properties of the secondary battery may be improved beyond the theoretical capacity limit of the carbon-based material.

The anode current collector 120 may include, e.g., gold, stainless steel, nickel, aluminum, titanium, copper or an alloy thereof, preferably may include copper or a copper alloy.

In some embodiments, a slurry may be prepared by mixing and stirring the anode active material with a binder, a conductive material and/or a dispersive agent in a solvent. The anode slurry may be coated on a surface of the anode current collector 120, and then dried and pressed to form the anode 140. Materials substantially the same as or similar to the above-mentioned materials may be used as the conductive material.

In exemplary embodiments, styrene-butadiene rubber (SBR) capable of reacting with the reactive additive of the above-described electrolyte may be used as the binder for the anode. In some embodiments, a thickener such as carboxymethyl cellulose (CMC) may be used together.

As described above, the silicon-based compound may be used as the anode active material to enhance the capacity and power properties. However, the silicon-based compound may have a high volume expansion/contraction ratio, and expansion and contraction of the anode active material layer 125 or anode active material particles may be repeated during repeated charging and discharging.

In this case, the anode active material particles may be decomposed or collapsed, and exposed in the electrolyte, which may cause depletion of the electrolyte and increase a resistance by irreversible decomposition of the electrolyte.

However, according to exemplary embodiments, SBR as the anode binder and the reactive additive included in the electrolyte may be combined so that expansion of the anode active material including the silicon-based compound may be suppressed.

The separation layer 150 may be interposed between the cathode 130 and the anode 140. The separation layer 150 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 150 may be also formed from a non-woven fabric including a glass fiber with a high melting point, a polyethylene terephthalate fiber, or the like.

In some embodiments, an area and/or a volume of the anode 140 (e.g., a contact area with the separation layer 150) may be greater than that of the cathode 130. Thus, lithium ions generated from the cathode 130 may be easily transferred to the anode 140 without loss by, e.g., precipitation or sedimentation.

In exemplary embodiments, an electrode cell 160 may be define by the cathode 130, the anode 140 and the separation layer 150, and a plurality of the electrode cells 160 may be stacked to form an electrode assembly having, e.g., a jelly roll shape. For example, the electrode assembly may be formed by winding, laminating or folding of the separation layer.

The electrode assembly may be accommodated together with the electrolyte according the above described embodiments in a case 170 to define a lithium secondary battery 100.

An electrode tab may be formed from each of the cathode current collector 110 and the anode current collector 120 included in each electrode cell 160, and may extend to one side of the case 170. The electrode tabs may be fused together with the one side of the case 170 to be connected to electrode leads that may be extended or exposed to and outside of the case 170.

The lithium secondary battery 100 may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

1. Preparation of Electrolyte

A solution of 1M $LiPF_6$ was prepared using a mixed solvent of EC/EMC/DEC (25:45:35; volume ratio), and electrolytes of Examples and Comparative Examples were prepared by adding additives shown in Table 1 below based on a total weight of the electrolyte.

TABLE 1

|  | Additives | |
| --- | --- | --- |
|  | Type | content (wt %) |
| Comparative Example 1 | — | — |
| Comparative Example 2 | Compound of Chemical Formula 3 | 1 |
| Example 1 | Compound of Chemical Formula 2 | 0.5 |
| Example 2 | Compound of Chemical Formula 2 | 0.5 |
|  | Compound of Chemical Formula 3 | 1 |
| Example 3 | Compound of Chemical Formula 2 | 0.1 |
|  | Compound of Chemical Formula 3 | 1 |
| Example 4 | Compound of Chemical Formula 2 | 5 |
|  | Compound of Chemical Formula 3 | 1 |

2. Fabrication of Secondary Battery (1) A slurry was prepared by mixing $Li[Ni_{0.6}Co_{0.2}Mn_{0.2}]O_2$ as a cathode active material, carbon black as a conductive material and polyvinylidene fluoride (PVdF) as a binder in a weight ratio of 92:5:3. The slurry was uniformly coated on an aluminum foil having a thickness of 15 μm, and vacuum dried at 130° C. The dried slurry was pressed to prepare a cathode for a lithium secondary battery having a density of 3.667 $g/cm^3$.

(2) 95 wt % of a blend of artificial graphite and natural graphite (weight ratio: 9:1) as an anode active material, 1 wt % of Super-P as a conductive material, 2 wt % of styrene-butadiene rubber (SBR) as a binder and 2 wt % of carboxymethyl cellulose (CMC) as a thickener was mixed to form an anode slurry. The anode slurry was uniformly coated on a copper foil having a thickness of 15 μm, dried and pressed to prepare an anode having a density of 1.684 $g/cm^3$.

(3) The cathode and the anode obtained as described above were notched with a proper size and stacked, and a separator (polyethylene, thickness: 20 μm) was interposed between the cathode and the anode to form an electrode assembly. Each tab portion of the cathode and the anode was welded. The welded cathode/separator/anode assembly was inserted in a pouch, and three sides of the pouch except for an electrolyte injection side were sealed. The tab portions were also included in sealed portions. The electrolytes of Examples and Comparative Examples were each injected through the electrolyte injection side, and then the electrolyte injection side was also sealed. Subsequently, the above structure was impregnated for more than 12 hours to obtain a lithium secondary battery having a capacity level of 1.7 Ah.

Experimental Example 1: Evaluation on Life-Span Property at Room Temperature

Charge (CC/CV 1 C 4.2V, 0.05 C CUT-OFF) and discharge (CC 1 C, 2.7V CUT-OFF) were performed for each of the prepared secondary batteries, and an initial discharge capacity was measured.

A cycle property at room temperature was calculated by dividing the discharge capacity in each cycle by the initial capacity while repeating 1,000 cycles of the charge/discharge, and the results are shown in Table 2 below.

Figure 2:
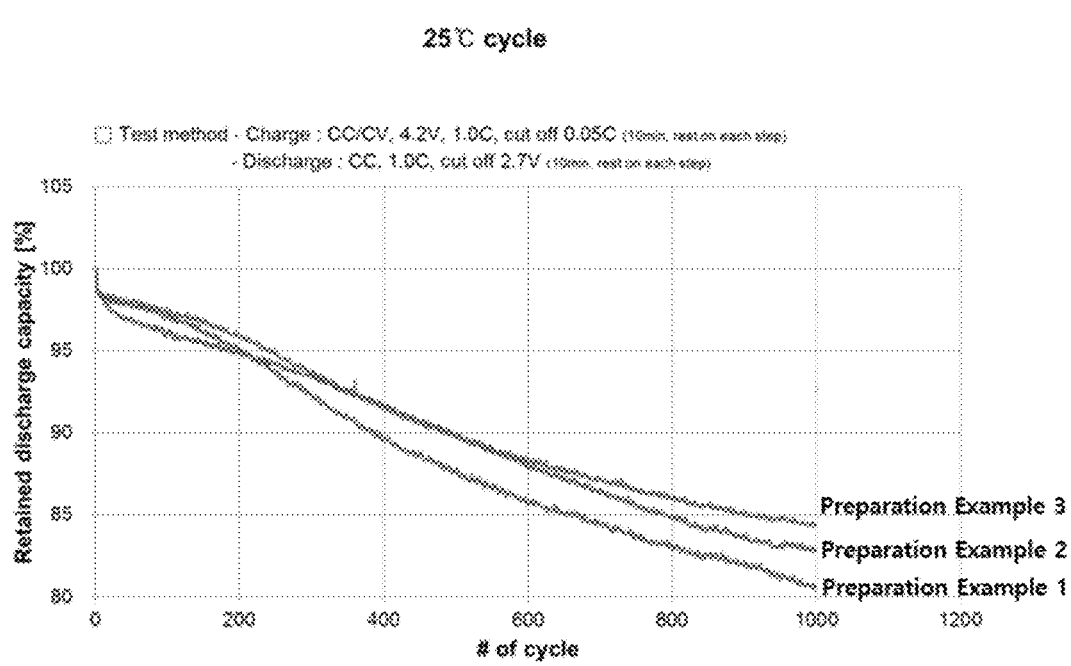
FIG. 2 is a graph showing capacity retentions according to repeated charging and discharging for lithium secondary batteries of Examples and Comparative Examples.

The capacity retention of the secondary batteries of Preparation Examples 1 to 3 are shown in the graph of FIG. 2.

Experimental Example 2: Evaluation of High-Temperature Storage Property

The secondary batteries of Preparation Examples were charged with 100% SoC, and stored in a chamber at 60° C. The secondary batteries stored for 1 week, 3 weeks, 5 weeks, 7 weeks and 8 weeks were each left at room temperature for 30 minutes, and a thickness change of the anode and a capacity retention were measured.

The capacity retention was calculated as a ratio of a discharge capacity after high-temperature storage relative to an initial discharge capacity.

Figure 3:
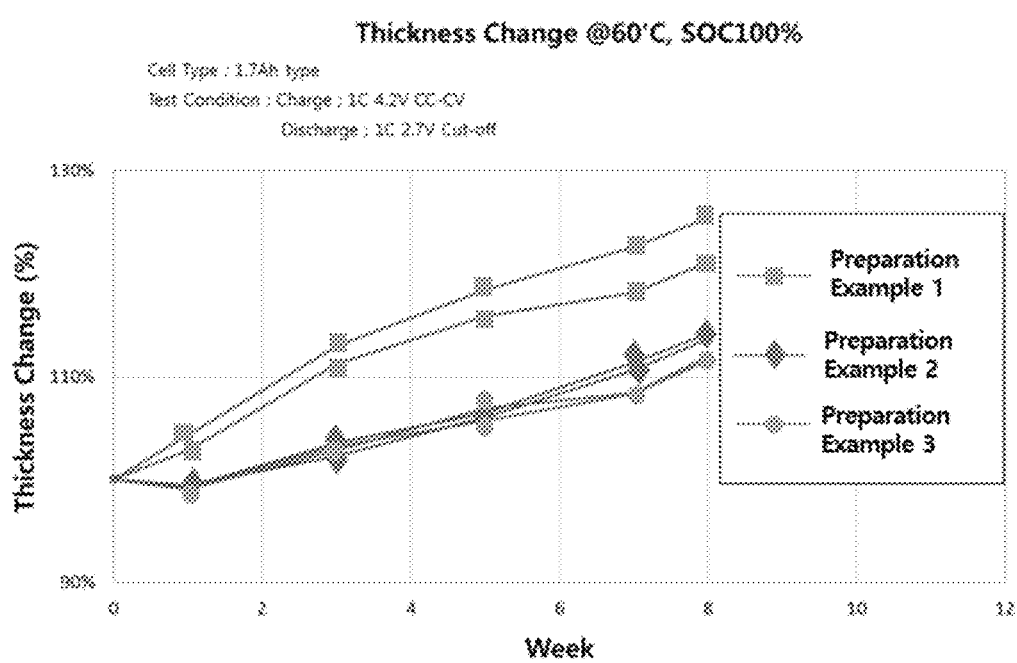
FIG. 3 is a graph showing thickness changes of anodes during high-temperature storage for lithium secondary batteries of Examples and Comparative Examples.
Figure 4:
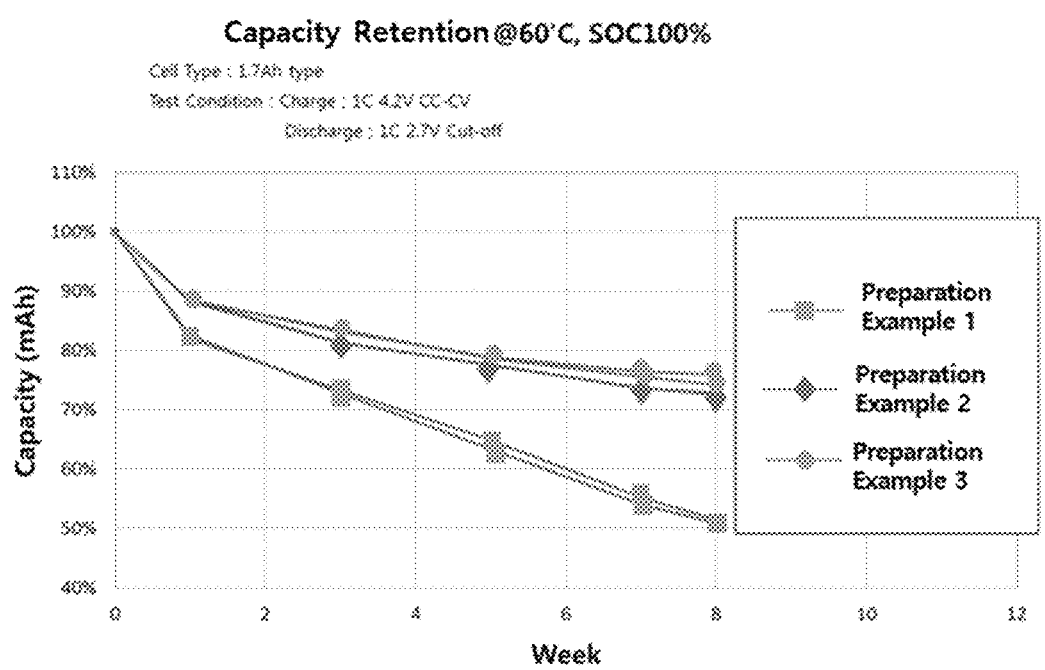
FIG. 4 is a graph showing capacity changes during high-temperature storage for lithium secondary batteries of Examples and Comparative Examples.

For the secondary batteries of Preparation Examples 1 to 3, thickness change ratio and capacity retention were measured twice, and the results are shown in FIGS. 3 and 4.

A thickness change ratio was calculated as a ratio of a thickness of the anode stored at high temperature relative to an initial thickness of the anode.

TABLE 2

| No. | Additives | Storage at room temperature Capacity Retention (%) (@ 1000 cycles) | High temperature storage (60° C., 8 weeks) thickness change (mm) | High temperature storage (60° C., 8 weeks) Capacity Retention (%) |
|---|---|---|---|---|
| Preparation Example 1 | Comparative Example 1 | 80.7 | 6.57 | 57 |
| Preparation Example 2 | Comparative Example 2 | 81.9 | 6.32 | 70 |
| Preparation Example 3 | Example 1 | 84.4 | 5.94 | 77 |
| Preparation Example 4 | Example 2 | 87.2 | 6.04 | 75 |
| Preparation Example 5 | Example 3 | 85.8 | 6.24 | 72 |
| Preparation Example 6 | Example 4 | 80.1 | 6.48 | 67 |

Referring to FIGS. 2 to 4 and Table 2, in secondary batteries using the electrolytes of Examples including the succinic anhydride-based additive, the life-span at room temperature high temperature storage properties were improved.

What is claimed is:

1. An electrolyte for a lithium secondary battery, comprising:
   an organic solvent;
   a lithium salt; and
   an additive comprising a succinic anhydride-based compound substituted with a trialkoxysilyl alkyl group.

2. The electrolyte for a lithium secondary battery according to claim 1, wherein an alkoxy group included in the trialkoxysilyl alkyl group has 1 to 6 carbon atoms.

3. The electrolyte for a lithium secondary battery according to claim 1, wherein an alkylene group of the trialkoxysilyl alkyl group has 1 to 6 carbon atoms.

4. The electrolyte for a lithium secondary battery according to claim 1, wherein the succinic anhydride-based compound is represented by Chemical Formula 1:

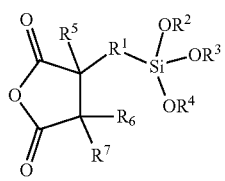

[Chemical Formula 1]

wherein, in Chemical Formula 1, $R^1$ is an alkylene group having 1 to 6 carbon atoms, $R^2$ to $R^4$ are each independently an alkyl group having 1 to 6 carbon atoms, and $R^5$ to $R^7$ are each independently hydrogen or an alkyl group having 1 to 6 carbon atoms.

5. The electrolyte for a lithium secondary battery according to claim 1, wherein the succinic anhydride-based compound comprises a compound represented by Chemical Formula 2:

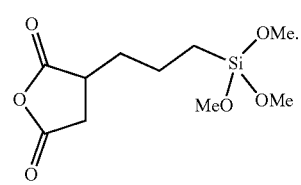

[Chemical Formula 2]

6. The electrolyte for a lithium secondary battery according to claim 1, wherein the succinic anhydride-based compound is included in an amount from 0.1 wt % to 5 wt % based on a total weight of the electrolyte.

7. The electrolyte for a lithium secondary battery according to claim 1, wherein the additive further comprises a lithium phosphate-based compound.

8. The electrolyte for a lithium secondary battery according to claim 7, wherein the lithium phosphate-based compound comprises a compound represented by Chemical Formula 3:

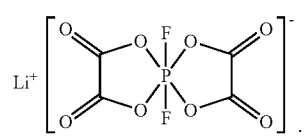

[Chemical Formula 3]

9. The electrolyte for a lithium secondary battery according to claim 7, wherein a weight ratio of the succinic anhydride-based compound and the lithium phosphate-based compound is in a range from 1:0.2 to 1:10.

10. The electrolyte for a lithium secondary battery according to claim 1, wherein the organic solvent comprises at least one of ethylene carbonate (EC), ethyl methyl carbonate (EMC), dimethyl carbonate (DMC) and diethyl carbonate (DEC).

11. A lithium secondary battery, comprising:
    a case;
    an electrode assembly including an anode and a cathode accommodated in the case; and
    the electrolyte for a lithium secondary battery of claim 1 injected into the case.

* * * * *